(12) United States Patent
Schrempf et al.

(10) Patent No.: US 8,579,119 B2
(45) Date of Patent: Nov. 12, 2013

(54) BACKWASH FILTER

(75) Inventors: Christoph Schrempf, Bad Schallerbach (AT); Helmut Fuchs, Frankenmarkt (AT); Ulrich Möderl, Thalgau (AT)

(73) Assignee: Lenzing Aktiengesellschaft, Lenzing (AT)

( * ) Notice: Subject to any disclaimer, the term of this patent is extended or adjusted under 35 U.S.C. 154(b) by 934 days.

(21) Appl. No.: 12/522,992

(22) PCT Filed: Jan. 17, 2008

(86) PCT No.: PCT/AT2008/000012
§ 371 (c)(1),
(2), (4) Date: Nov. 23, 2009

(87) PCT Pub. No.: WO2008/086554
PCT Pub. Date: Jul. 24, 2008

(65) Prior Publication Data
US 2010/0065489 A1 Mar. 18, 2010

(30) Foreign Application Priority Data
Jan. 18, 2007 (AT) .................................. 94/2007

(51) Int. Cl.
*B01D 33/073* (2006.01)
*B01D 33/50* (2006.01)
*B01D 33/76* (2006.01)
*B01D 33/56* (2006.01)

(52) U.S. Cl.
USPC ............................ 210/393; 210/397; 210/402

(58) Field of Classification Search
USPC ......................... 210/391, 393, 397, 398, 402
See application file for complete search history.

(56) References Cited

U.S. PATENT DOCUMENTS 2,650,711 A * 9/1953 Gilcrest ........................ 210/107
3,140,995 A * 7/1964 Kinney .......................... 210/393

(Continued)

FOREIGN PATENT DOCUMENTS

AT 004594 U1 9/2001
AT 408 522 B 12/2001

(Continued)

OTHER PUBLICATIONS

PCT Notification of Transmittal of Translation of the International Preliminary Report on Patentability (Chapter I or Chapter II of the Patent Cooperation Treaty) (Form PCT/IB/338); PCT International Preliminary Report on Patentability (Chapter I of the Patent Cooperation Treaty) (Form PCT/IB/373); PCT Written Opinion of the International Searching Authority (Form PCT/ISA/237), Aug. 13, 2009.

*Primary Examiner* — Thomas M Lithgow
(74) *Attorney, Agent, or Firm* — Fitzpatrick, Cella, Harper & Scinto (57) ABSTRACT

A backwash filter, in particular for highly viscous media, comprising a filter body (2) provided in a casing (1) and forming a cylinder jacket, wherein the casing (1) and the filter body (2) are rotatable about the axis of the filter body (2) relative to one another and wherein the filter body (2) separates a medium inflow space (14) from a medium outflow space (16), and comprising a flushing agent discharge channel (10) extending along a generatrix of the filter body (2), which flushing agent discharge channel (10) is movable relative to the filter body (2) and can be brought into flow connection with the filter body (2) across the entire length thereof and across the entire circumference thereof, with the formation of a stream of flushing agent flowing into the flushing agent discharge channel (10), is characterized, for increasing the efficiency of backwashing and of the throughput as well as for protection of the filter material, in that the flow connection always occurs only across a portion of the longitudinal extension (20) of a generatrix of the filter body (2).

9 Claims, 7 Drawing Sheets

(56) References Cited

U.S. PATENT DOCUMENTS

| | | | |
|---|---|---|---|
| 3,574,509 A | * | 4/1971 | Zentis et al. ............ 210/107 |
| 3,622,006 A | * | 11/1971 | Brunner ................. 210/355 |
| 5,030,347 A | * | 7/1991 | Drori ..................... 210/331 |
| 5,268,095 A | | 12/1993 | Barzuza ................. 210/143 |

FOREIGN PATENT DOCUMENTS

| | | | |
|---|---|---|---|
| DE | 41 16 199 A1 | | 11/1992 |
| DE | 195 23 462 A1 | | 1/1997 |
| DE | 198 03 083 A1 | | 7/1999 |
| DE | 200 14 299 U1 | | 1/2002 |
| DE | 102 52 785 A1 | | 5/2004 |
| DE | 10 2004 049 643 A1 | | 4/2006 |
| EP | 0 781 356 B1 | | 7/1998 |
| EP | 855205 | * | 7/1998 |
| WO | 92/16351 A1 | | 10/1992 |
| WO | 97/12083 | | 4/1997 |
| WO | 01/12293 A1 | | 2/2001 |

* cited by examiner

BACKWASH FILTER

BACKGROUND OF THE INVENTION

Field of the Invention

The invention relates to a backwash filter, in particular for highly viscous media, comprising a filter body provided in a casing and forming a cylinder jacket, wherein the casing and the filter body are rotatable about the axis of the filter body relative to one another and wherein the filter body separates a medium inflow space from a medium outflow space, and comprising a flushing agent discharge channel extending along a generatrix of the filter body, which flushing agent discharge channel is movable relative to the filter body and can be brought into flow connection with the filter body across the entire length thereof and across the entire circumference thereof, with the formation of a stream of flushing agent flowing into the flushing agent discharge channel.

Backwash filters are known in many variants, such as, for example, from DE 198 03 083 A1, DE 195 23 462 A1 or AT 004594 U1. All these known backwash filters have a casing in which a filter body shaped like a cylinder jacket is provided, which filter body separates a medium inflow space from a medium outflow space. Due to a difference in pressure, the medium to be filtered thus flows through the filter body and thereby is cleaned from impurities. The impurities deposit on the filter body and the filter material, respectively, facing the medium inflow space and must be removed from the filter body after a certain amount of time, which is accomplished by backwashing. According to document DE 195 23 462 A1, said backwashing is effected via a flushing channel provided in the medium outflow space, which flushing channel extends along the filter body and is movable relatively around the circumference thereof, whereby the filter body rotating around its longitudinal axis is cleaned consecutively along its generatrix across the entire length thereof, by having a purified, i.e. already filtered medium flowing across the filter body into the flushing agent discharge channel in a direction opposite to the flow of the unpurified medium.

According to DE 198 03 083 A1, a flushing agent feed channel is located in the medium outflow space, which flushing agent feed channel extends along a generatrix of the filter body, conveying flushing agent across the filter body to a flushing agent discharge channel arranged vis-a-vis, whereby the filter body is cleaned along a generatrix across its entire length. As a result of a relative motion between the flushing agent feed channel and the filter body or the filter body and the flushing agent discharge channel, respectively, the filter body is cleaned across its entire circumference.

Backwash filters of this kind have the disadvantage that relatively large amounts of backwash liquid are required. Since the filter body is cleaned all at once across its entire length, as is shown in DE 195 23 462 A1 and DE 198 03 083 A1, the efficiency of the backwash filter decreases substantially. For this reason, the known backwash filters are suitable only for media of low viscosity. Furthermore, a relatively high pressure difference is necessary for cleaning the filter body, which pressure difference puts a lot of strain on the filter material supported by the filter body.

The invention aims at avoiding the above-described disadvantages and difficulties and has as its object to provide a backwash filter of the initially described kind, which gets by with a small flushing volume. In addition, a more efficient flushing of the filter material is to be made possible with a mechanical engineering effort as small as possible so that extra fine filter materials can also be employed for backwash filters. This exceedingly good flushing should not be caused by an increased overpressure, which would be necessary for backwash filters according to the prior art, but is to be effected also in case of a small pressure difference at the filter body between the flushing agent inflow and the flushing agent outflow. In addition, it should be possible to provide, due to the small difference in pressure, larger free filter material areas not covered by supporting areas of the filter body so that the backwash filter enables a significantly larger throughput.

SUMMARY OF THE INVENTION

According to the invention, said object is achieved in that the flow connection always occurs only across a portion of the longitudinal extension of a generatrix of the filter body.

According to a preferred embodiment, the medium inflow space is formed between the casing and the filter body, and the medium outflow space is formed in the interior of the filter body, with the flushing agent discharge channel provided outside of the filter body.

Preferably, the flushing agent discharge channel is formed by a pipe mounted rotatably about its longitudinal axis, which pipe is provided with a slot extending in the shape of a helix across the wall of the pipe and connecting the pipe's interior to the exterior thereof, with the outer surface of the pipe contacting the filter body across the entire longitudinal extension thereof. The purified medium can thereby be used as a backwash liquid, with only a small amount thereof being required for a high backwash effect, since said medium gets into the flushing agent discharge channel only across a very small length of a generatrix of the filter body.

According to a different embodiment, the same advantage can be achieved in that the flushing agent discharge channel is formed by a pipe displaceable along its longitudinal axis, which pipe has a radially oriented flushing opening connecting its interior to its exterior, which flushing opening has an extension along the longitudinal axis of the pipe which is smaller than the longitudinal extension of the filter body, with the outer surface of the pipe preferably contacting the filter body across the entire longitudinal extension thereof and with the flushing opening being oriented toward the filter body.

If it is desired, for example, to use a flushing fluid other than the purified medium for the two above-described variants, a flushing agent feed channel is advantageously provided in the interior of the filter body vis-a-vis the flushing agent discharge channel provided outside of the filter body, with the flushing agent feed channel having a longitudinal slot oriented toward the flushing agent discharge channel and extending across the entire longitudinal extension of the filter body. In this way, a flushing agent pressure can also be adjusted independently of the pressure of the purified medium.

According to another advantageous embodiment, the flushing agent discharge channel has a longitudinal slot extending across the entire longitudinal extension of the filter body, and a flushing agent feed channel arranged vis-a-vis the flushing agent discharge channel is provided, which flushing agent feed channel is formed by a pipe mounted rotatably about its longitudinal axis and provided with a slot extending in the shape of a helix across the wall of the pipe and connecting the pipe's interior to the exterior thereof, with the outer surface of the pipe contacting the filter body across the entire longitudinal extension thereof. Also in this case, the flushing agent pressure is independent of the pressure of the filtered medium, and a flushing agent of a kind other than the filtered medium can also be used.

Said advantages also arise in the suitable embodiment which is characterized in that the flushing agent discharge channel is provided with a slot extending across the entire longitudinal extension of the filter body and that a flushing agent feed channel is provided vis-a-vis the flushing agent discharge channel, which flushing agent feed channel is formed by a pipe mounted displaceably along its longitudinal axis, which pipe has a flushing opening radially oriented toward the slot of the flushing agent discharge channel and is displaceable with said flushing opening from one end of the filter body to the other end of the filter body and beyond, with the flushing opening having an extension in the direction of the longitudinal axis of the pipe which is shorter than the longitudinal extension of the filter body.

In order to avoid losses, the flushing agent discharge channel is advantageously sealed off with gaskets against the filter body on both sides of the generatrix along which the flushing agent discharge channel contacts the filter body.

Advantageously, the filter body has a pressure plate and a support plate as well as a filter material arranged therebetween.

Preferably, the filter body is rotatably mounted relative to the stationary casing, wherein a feed inlet for medium to be filtered is provided in the casing in the direction of rotation of the filter body, immediately adjacent to the flushing agent discharge channel. As a result, the highest pressure prevails in the part of the filter body which is already burdened most and/or provided with most impurities, and, respectively, the contaminated medium establishes the first direct contact with the filter body, whereas the medium reaches filter areas charged with less and less impurities by flowing around the filter body at a lower pressure.

BRIEF DESCRIPTION OF THE DRAWINGS

For a better understanding of the present invention, reference is made to the following examples and drawings. Referring to the drawings.

DETAILED DESCRIPTION OF THE INVENTION

It has turned out to be advantageous for the helical slot to be two-start.

For highly viscous media, the portion of the flow connection suitably extends across at most 20%, preferably at most 5%, of the longitudinal extension of the filter body.

Figures 1, 2:
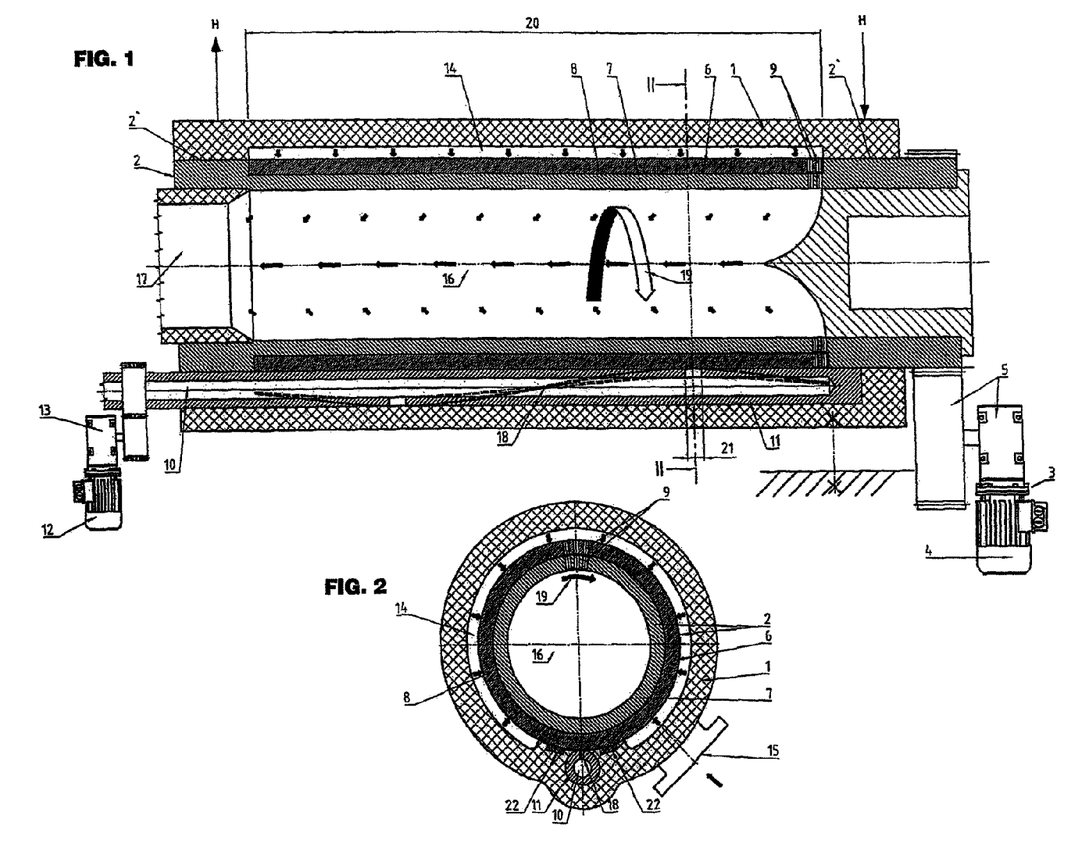
FIG. 1 shows a longitudinal section through an exemplary embodiment of a backwash filter according to the invention.
FIG. 2 shows a transverse section through the exemplary backwash filter shown in FIG. 1.
Figure 13:
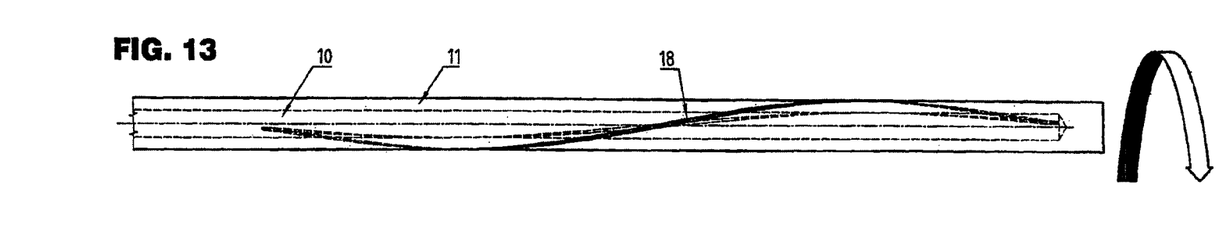
FIG. 13 shows an exemplary embodiment of feed channels according to the invention.
Figure 14:
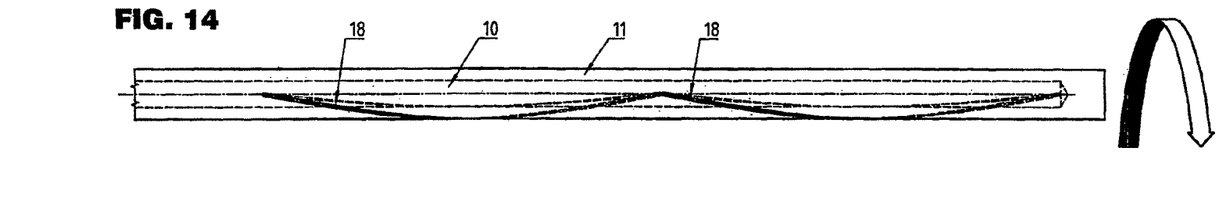
FIG. 14 shows an exemplary embodiment of flushing agent discharge channels according to the invention.
Figure 15:
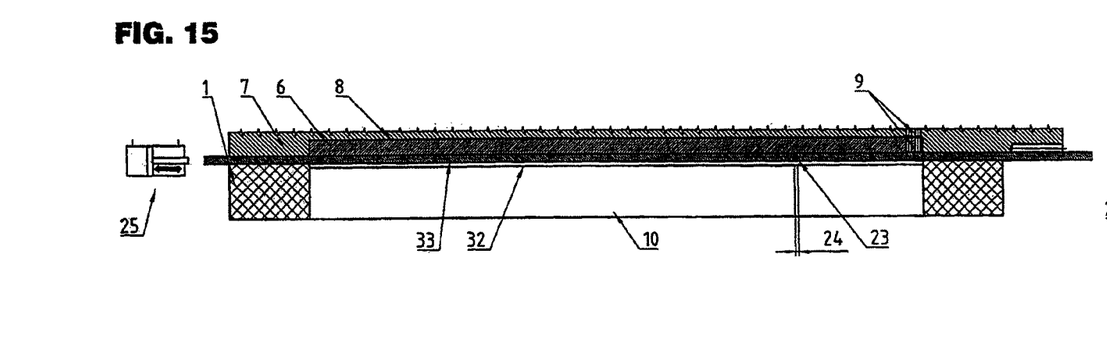
FIG. 15 shows a longitudinal section through discharge channels of the exemplary backwash filters of FIGS. 9, 10, 11 and 12.
Figure 16:
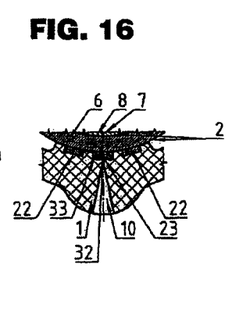
FIG. 16 shows a transverse section of the exemplary discharge channel of FIG. 15.

Below, the invention is described in further detail based on several exemplary embodiments illustrated in the drawing, wherein FIG. 1 shows a longitudinal section through a backwash filter and FIG. 2 shows a transverse section through the same filter taken along line II-II of FIG. 1 according to a first embodiment of a backwash filter. FIGS. 3 and 4 and 5 and 6, respectively, as well as 7 and 8 and also 9 and 10 and 11 and 12 each show further embodiments in illustrations which are analogous to FIGS. 1 and 2. FIGS. 13 and 14 show views of flushing agent feed channels and flushing agent discharge channels, respectively, in the disassembled state. FIGS. 15 and 16 illustrate a variant in the longitudinal section (FIG. 15) and in the transverse section (FIG. 16).

According to the embodiment of a backwash filter illustrated in FIG. 1, in a casing 1 designed in the shape of a cylinder jacket, a filter body 2, which is also shaped like a cylinder jacket, is rotatably mounted, the casing 1 being arranged in a stationary manner. The rotary drive 3 for the filter body 2 is implemented by an electric motor 4 which drives the filter body 2 via a toothed gear 5. The backwash filter is provided with a ventilation and has a control device for the control of pressures. The casing 1 is heatable; the heating pipelines are indicated by H.

The filter body 2 itself has a pressure plate 6 extending on the outside across the entire circumference, which optionally is composed of segments, and an internal support plate 7 also extending across the entire circumference, between which plates the filter material 8 is inserted. Both the pressure plate and the support plate are provided with radially oriented openings 9 so that a medium can flow through the openings 9 while passing the filter material 8. Said openings 9 are depicted only at one end of the filter body 2, however, they are provided across the entire longitudinal extension 20 thereof. By the longitudinal extension 20 of the filter body 2 the length is understood across which the filter material 8 extends. Thereby, various supporting areas 2' for mounting the filter body remain unconsidered.

A flushing agent discharge channel 10 extends along a generatrix of the filter body 2. The flushing agent discharge channel 10 is formed by a rotatably mounted pipe 11, which is also drivable by an electric motor 12 via a transmission 13 and tangentially contacts the filter body 2 on the outside, i.e., on the outside of the pressure plate 6. Said pipe 11 extends across the entire longitudinal extension 20 of the filter body 2 and is rotatably mounted in the casing 1.

Between the casing 1 and the filter body 2, a medium inflow space 14 is formed, which is supplied, via a feed inlet 15, with fresh medium still to be purified. The interior space 16 of the filter body 2 forms the medium outflow space for the filtered medium, which filtered medium flows off through a discharge channel 17.

The pipe 11 has a slot 18 extending across its entire length, which slot connects the interior of the pipe 11, i.e., the flushing agent discharge channel 10, to the exterior thereof and extends in the shape of a helix across the wall of the pipe 11.

The backwash filter has the following function:

The medium to be filtered gets into the medium inflow space 14 via the feed inlet 15, namely at a point which is provided immediately adjacent to the position of the flushing agent discharge channel 10, in the direction of rotation of the filter body 2, which direction is indicated by the arrow 19. The medium to be filtered now spreads evenly across the circumference of the filter body 2, flows through the openings 9 thereof and thus reaches, in a filtered state, the central interior space of the filter body 2 forming the medium discharge space 16.

Due to the tangential contact of the pipe 11 of the flushing agent discharge channel 10 with the outer wall of the filter body 2, the flushing agent discharge channel 10 is brought into flow connection with the filter body 2 and hence also into flow connection with the medium outflow space 16, wherein, however—and this is essential—said flow connection extends only across a very short longitudinal extension 20 of the filter body 2, particularly as the slot 18 helically extending around the pipe 11 is always oriented toward the filter body 2 only with a very small part 21 of its longitudinal extension. By rotating the pipe 11 continuously or also discontinuously, all openings 9 of the filter body 2 which are located on a generatrix are gradually brought into flow connection with the flushing agent discharge channel 10 so that a cleaning of all openings 9 is effected by backwashing with a medium that has already been purified. It thereby becomes possible also for highly viscous media to get by with a small pressure difference during backwashing, since said pressure difference is focused only on a small area of the filter material 8.

The filter body 2 can likewise be rotated continuously or discontinuously. The discontinuous rotation can be controlled by the pressure course so that an operation results which is as constant in pressure as possible. The rotation of the filter body 2 can occur gradually (e.g., in each case by 5°).

In order to avoid losses, the flushing agent discharge channel 10, i.e. the pipe 11, is embedded in the casing 1, with the casing 1 being provided, immediately adjacent to the flushing agent discharge channel 10, with gaskets 22 oriented toward the filter body 2 and extending along the entire length of the casing 1 on both sides of the flushing agent discharge channel 10.

The flushing agent discharge channel 10, i.e. the pipe 11, may be provided with a slot 18 helically extending along the pipe 11 in a single-start fashion or also with a slot 18 helically extending along the pipe 11 in a two- or multi-start fashion. A two-start slot 18 is illustrated in FIG. 14. Analogously to the illustration of FIG. 1, FIG. 13 shows a single-start slot 18.

Figures 3, 4:
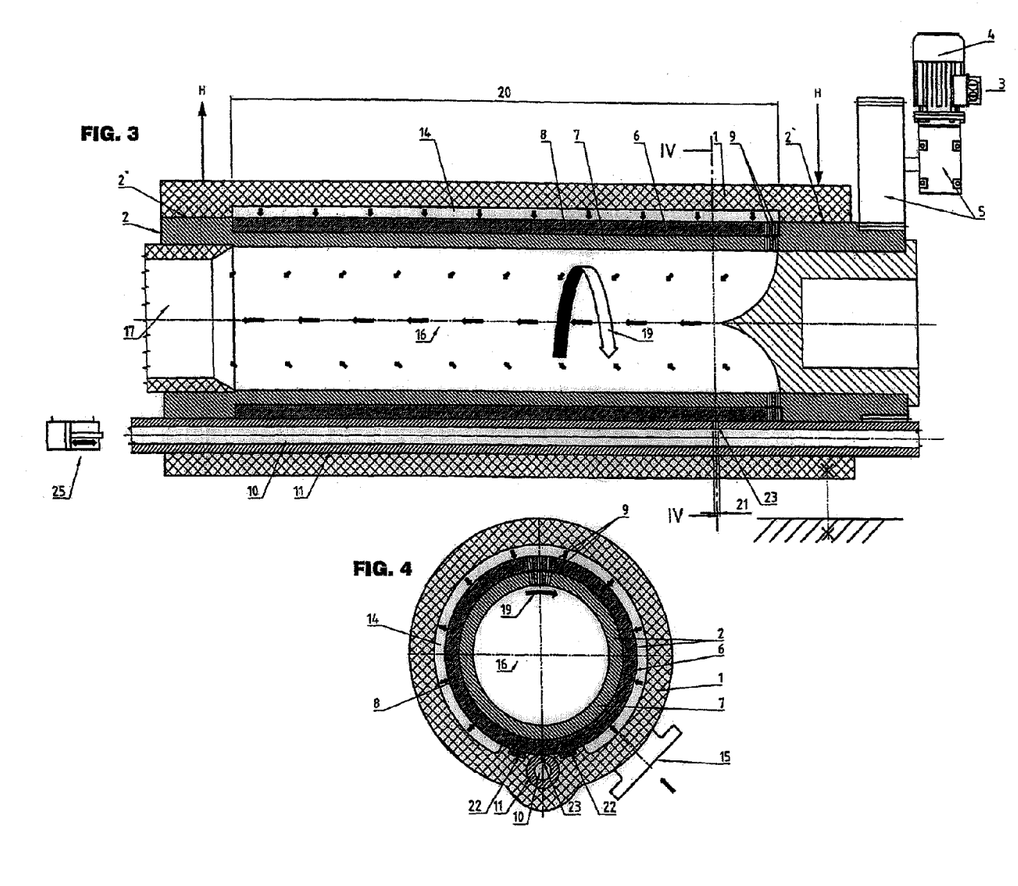
FIG. 3 shows a longitudinal section through another exemplary embodiment of a backwash filter according to the invention.
FIG. 4 shows a transverse section through the exemplary backwash filter shown in FIG. 3.

According to the embodiment illustrated in FIGS. 3 and 4, the flushing agent discharge channel 10, i.e. the pipe 11, is not rotatably mounted in the casing 1 but is longitudinally displaceable and has a flushing opening 23 radially oriented toward the filter body 2. Said flushing opening 23 has a longitudinal extension 24, i.e. an extension parallel to a generatrix of the filter body 2, which is significantly smaller than the longitudinal extension 20 of the filter body 2. A displacing device 25 for the flushing agent discharge channel 10 is schematically indicated in FIG. 3. The flushing opening 23 can be displaced continuously or discontinuously from one end of the filter body 2 to the other end of the filter body 2 across the longitudinal extension 20 thereof and beyond so that, again, all openings 9 of a generatrix of the filter body 2 are gradually cleaned.

Figures 5, 6:
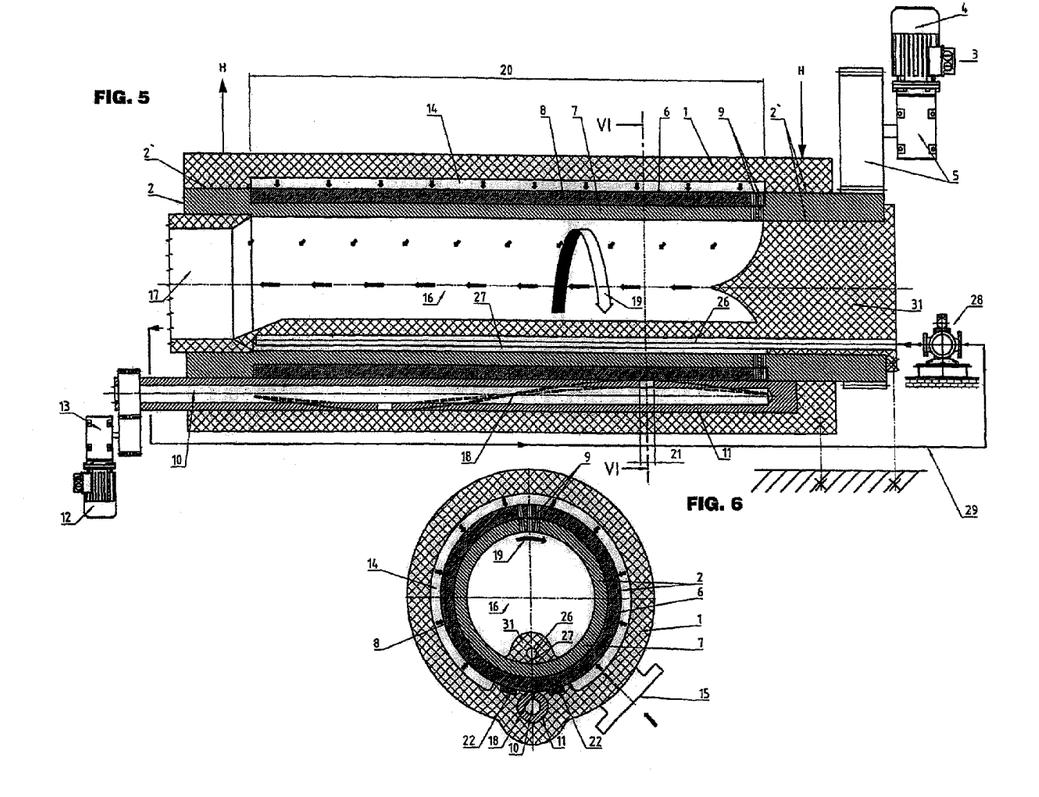
FIG. 5 shows a longitudinal section through a further exemplary embodiment of a backwash filter according to the invention.
FIG. 6 shows a transverse section through the exemplary backwash filter of FIG. 5.

The variant of a backwash filter illustrated in FIGS. 5 and 6 basically corresponds to the embodiment illustrated in FIGS. 1 and 2, except for a flushing agent feed channel 26 provided in the interior of the filter body 2, i.e. in the medium outflow space 16, and having a longitudinal slot 27 extending across the entire longitudinal extension 20 of the filter body 2. The flushing agent feed channel 26 is provided in a stationary manner and thus is arranged in a stationary insert body 31 relative to which the filter body is rotatable. Because of this, it is feasible to use a flushing agent having a pressure independent of the pressure of the purified medium for cleaning the filter material 8. A pressure booster pump 28 provided in a conduit 29 conveying the purified medium to the flushing agent feed channel 26 is schematically illustrated in FIG. 5. Instead of the pressure booster pump 28, a piston pressure system can also be used.

Figure 7:
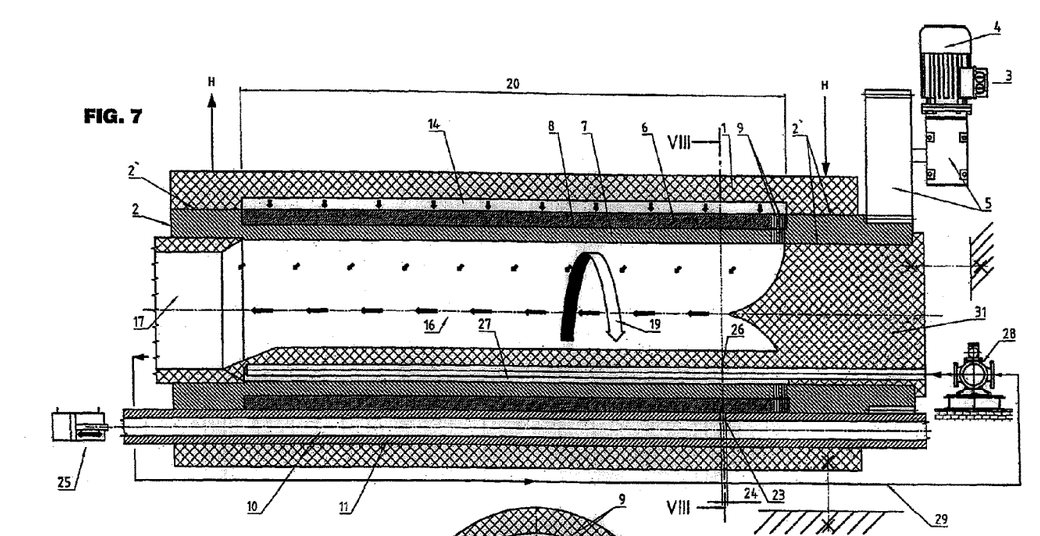
FIG. 7 shows a longitudinal section through another exemplary embodiment of a backwash filter according to the invention.
Figure 8:
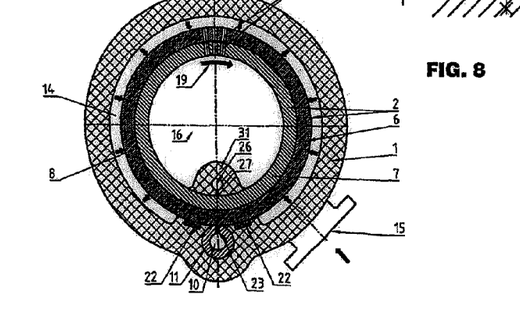
FIG. 8 shows a transverse section through the exemplary backwash filter of FIG. 7.

FIGS. 7 and 8 show a backwash filter variant according to which a flushing agent feed channel 26, as illustrated in FIGS. 5 and 6, is provided, however, with the flushing agent discharge channel 10 being provided so as to be longitudinally displaceable, analogously to the variant shown in FIGS. 3 and 4.

Figures 9, 10:
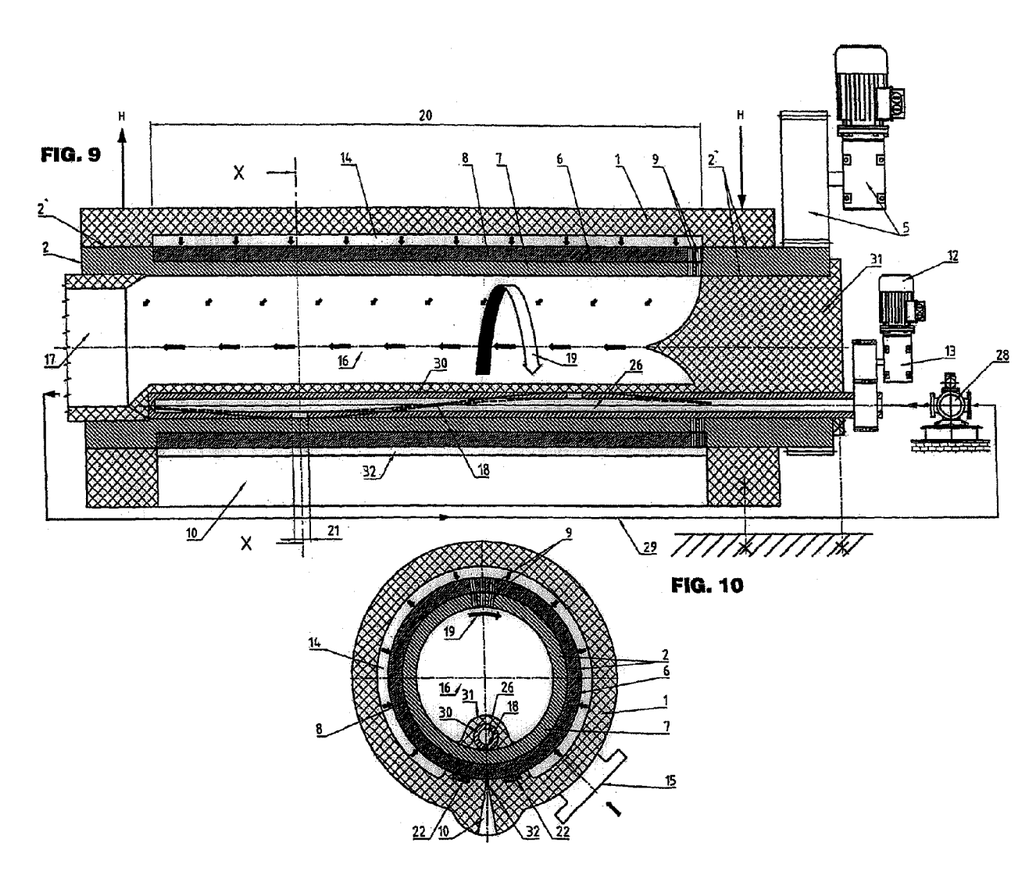
FIG. 9 shows a longitudinal section through a further exemplary embodiment of a backwash filter according to the invention.
FIG. 10 shows a transverse section through the exemplary backwash filter of FIG. 9.

FIGS. 9 and 10 show a variant according to which the flushing agent discharge channel 10 has a straight slot 32 extending across the entire length of the filter body 2, which slot is stationary and oriented directly toward the filter body 2. A flushing agent feed channel 26 is, in this case, formed by a rotatable pipe 30 which is designed analogously to the flushing agent discharge channel 10 of the variant illustrated in FIGS. 1 and 2, i.e. the pipe 11 thereof. It has a slot 18 (single-, two- or multi-start) extending in the shape of a helix across its length, whereby the filter body 2, i.e. the openings 9 thereof, is charged with flushing agent only across a short longitudinal extension 21. By rotating the pipe 30 continuously or discontinuously, it is again feasible to clean the filter body 2 across the entire longitudinal extension 20 of one of its generatrices.

Figures 11, 12:
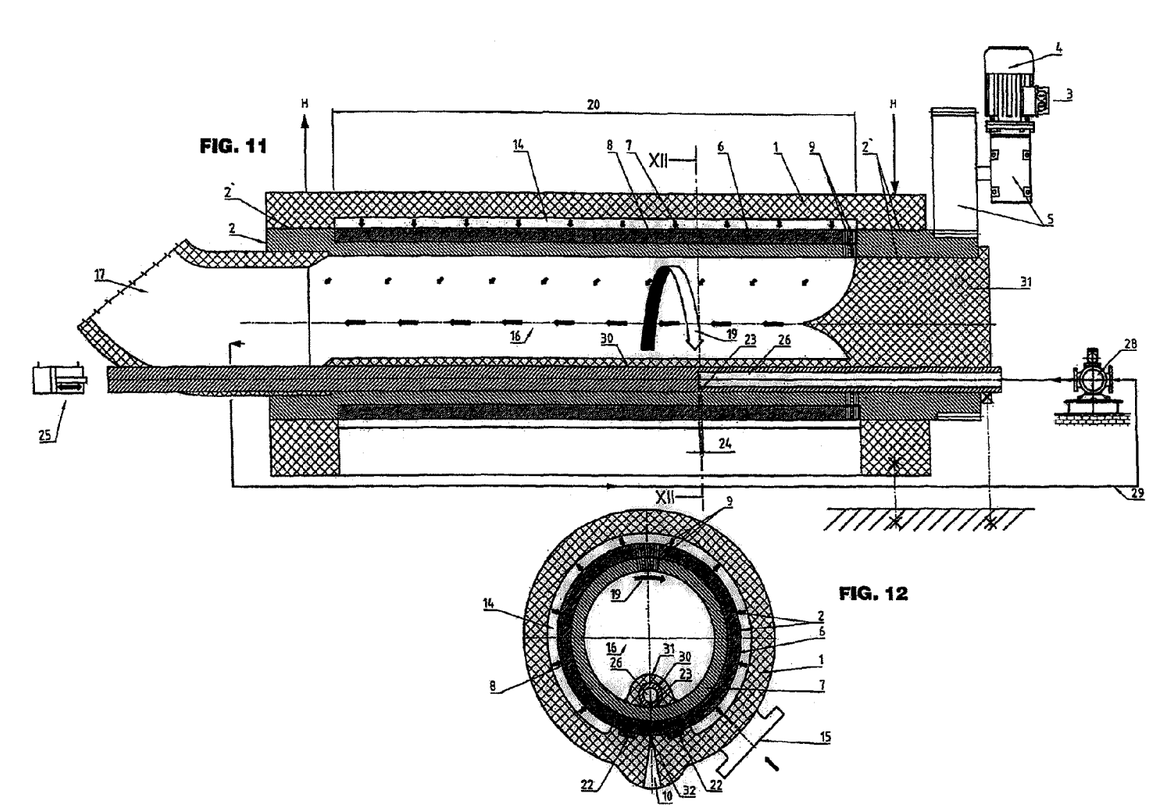
FIG. 11 shows a longitudinal section through another exemplary embodiment of a backwash filter according to the invention.
FIG. 12 shows a transverse section through the exemplary backwash filter of FIG. 11.

A variant of the backwash filter comprising a pipe 30 designed analogously to the pipe 11 of the variant shown in FIGS. 3 and 4 is illustrated in FIGS. 11 and 12. The flushing opening 23, which again has only a small longitudinal extension 24 compared to the longitudinal extension 20 of the filter body 2, is displaceable across the entire longitudinal extension 20 of the filter body 2 so that, again, the filter body 2 can be cleaned on one of its generatrices across the entire longitudinal extension 20 thereof. Also in this case, the flushing agent discharge channel 10 has a slot 32 extending across the entire longitudinal extension 20 of the filter body 2.

According to the embodiments illustrated in FIGS. 7 to 12, the insert bodies 31 are also supported in a stationary manner.

According to the variant illustrated in FIGS. 15 and 16, the flushing agent discharge channel 10 is designed like in the embodiments illustrated in FIGS. 9 to 12, i.e. as a stationary straight slot 32. A flow connection for the flushing agent extending only across a portion of the longitudinal extension 20 is achieved by means of a slide 33 which covers the slot 32 but exhibits a flushing opening 23 movable across the entire longitudinal extension 20.

In particular, the invention is applicable for the Lyocell technology. The backwash filter may have leakage openings analogously to EP 0 781 356 A1 in appropriate places.

What is claimed is:

1. A backwash filter comprising (1) a filter body provided in a casing and forming a cylinder jacket, wherein the casing and the filter body are rotatable about the axis of the filter body relative to one another and wherein the filter body separates a medium inflow space from a medium outflow space, and (2) a flushing agent discharge channel extending along a generatrix of the filter body, wherein said flushing agent discharge channel is movable relative to the filter body and can be brought into flow connection with the filter body across the entire length thereof and across the entire circumference thereof, with the formation of a stream of flushing agent flowing into the flushing agent discharge channel, and wherein flow connection always occurs only across a portion of the longitudinal extension of a generatrix of the filter body;

wherein the flushing agent discharge channel is sealed off with gaskets against the filter body on both sides of the generatrix along which the flushing agent discharge channel contacts the filter body;

wherein the filter body comprises a pressure plate, a support plate, and a filter material arranged therebetween;

wherein the filter body is rotatable mounted relative to the stationary casing, wherein a feed inlet for medium to be filtered is provided in the casing in the direction of rotation of the filter body, immediately adjacent to the flushing agent discharge channel.

2. The backwash filter according to claim 1, wherein the medium inflow space is formed between the casing and the filter body and the medium outflow space is formed in the interior of the filter body, and wherein the flushing agent discharge channel is provided outside of the filter body.

3. The backwash filter according to claim 1 or 2, wherein the flushing agent discharge channel is formed by a pipe mounted rotatably about its longitudinal axis, wherein the pipe is provided with a slot extending in the shape of a helix across the wall of the pipe and connecting the pipe's interior to the exterior thereof, and wherein the outer surface of the pipe contacts the filter body across the entire longitudinal extension thereof.

4. The backwash filter according to claim 1 or 2, wherein the flushing agent discharge channel is formed by a pipe displaceable along its longitudinal axis, wherein the pipe has a radially oriented flushing opening connecting its interior to its exterior, wherein the flushing opening has an extension along the longitudinal axis of the pipe which is smaller than the longitudinal extension of the filter body, wherein the outer surface of the pipe preferably contacts the filter body across the entire longitudinal extension thereof, and wherein the flushing opening is oriented toward the filter body.

5. The backwash filter according to any of claim 4, wherein a flushing agent feed channel is provided in the interior of the filter body, wherein vis-a-vis the flushing agent discharge channel is provided outside of the filter body, and wherein the flushing agent feed channel has a longitudinal slot oriented toward the flushing agent discharge channel and extends across the entire longitudinal extension of the filter body.

6. The backwash filter according to claim 1 or 2, wherein the flushing agent discharge channel has a longitudinal slot extending across the entire longitudinal extension of the filter body, wherein a flushing agent feed channel arranged vis-a-vis the flushing agent discharge channel is provided, wherein the flushing agent feed channel is formed by a pipe mounted rotatably about its longitudinal axis and provided with a slot extending in the shape of a helix across the wall of the pipe and connecting the pipe's interior to the exterior thereof, and wherein the outer surface of the pipe contacts the filter body across the entire longitudinal extension thereof.

7. The backwash filter according to claim 1 or 2, wherein the flushing agent discharge channel is provided with a slot extending across the entire longitudinal extension of the filter body, wherein a flushing agent feed channel is provided vis-a-vis the flushing agent discharge channel, wherein the flushing agent feed channel is formed by a pipe mounted displaceably along its longitudinal axis, wherein the pipe has a flushing opening radially oriented toward the slot of the flushing agent discharge channel and is displaceable with said flushing opening from one end of the filter body to the other end of the filter body and beyond, and wherein the flushing opening has an extension in the direction of the longitudinal axis of the pipe which is shorter than the longitudinal extension of the filter body.

8. The backwash filter according to claim 3, wherein the helical slot is two-start.

9. The backwash filter according to claim 1, wherein the portion of the flow connection extends across at most from about 20% to about 5%, of the longitudinal extension of the filter body.

* * * * *